(12) United States Patent
Brown et al.

(10) Patent No.: US 8,585,803 B2
(45) Date of Patent: Nov. 19, 2013

(54) TREATMENT OF CONTAMINATED GASES

(75) Inventors: Nigel W. Brown, Alsager (GB); Edward P. L. Roberts, Chester (GB)

(73) Assignee: Arvia Technology Limited, Liverpool (GB)

( * ) Notice: Subject to any disclaimer, the term of this patent is extended or adjusted under 35 U.S.C. 154(b) by 0 days.

(21) Appl. No.: 13/490,827

(22) Filed: Jun. 7, 2012

(65) Prior Publication Data

US 2012/0304857 A1  Dec. 6, 2012

Related U.S. Application Data

(63) Continuation of application No. 12/760,971, filed on Apr. 15, 2010, which is a continuation of application No. PCT/GB2008/003532, filed on Oct. 17, 2008.

(30) Foreign Application Priority Data

Oct. 18, 2007 (GB) .................................. 0720429.0

(51) Int. Cl.
*B01D 53/02* (2006.01)
(52) U.S. Cl.
USPC ...... 95/92; 95/94; 95/185; 210/670; 210/694; 210/748.01
(58) Field of Classification Search
USPC ............ 95/92, 94, 185; 210/670, 694, 748.01
See application file for complete search history.

(56) References Cited

U.S. PATENT DOCUMENTS

| | | |
|---|---|---|
| 4,227,899 A | 10/1980 | Meny et al. |
| 4,239,607 A | 12/1980 | Maget |
| 5,458,784 A | 10/1995 | Baker et al. |
| 5,494,506 A | 2/1996 | Ford et al. |
| 6,294,142 B1 | 9/2001 | Nazri |
| 2009/0242488 A1 | 10/2009 | Eccleston et al. |
| 2009/0321361 A1 | 12/2009 | Eccleston et al. |

FOREIGN PATENT DOCUMENTS

| | | |
|---|---|---|
| DE | 10150220 | 6/2001 |
| EP | 0518075 | 12/1992 |
| FR | 2697011 | 10/1992 |
| GB | 2442950 | 4/2008 |
| JP | 2000342961 | 6/1999 |
| RU | 2117635 | 1/1997 |
| SU | 1806005 | 6/1991 |
| WO | 01/07147 | 7/2000 |
| WO | 2006/022599 | 2/2006 |
| WO | 2007/125334 | 4/2007 |
| WO | 2008/047132 | 4/2008 |

OTHER PUBLICATIONS

International Search Report in PCT/GB2008/003532, dated Feb. 5, 2009.

OTHER PUBLICATIONS

Office Action in U.S. Appl. No. 12/760,971, dated Dec. 30, 2011.
UKIPO Further Search Report in GB 0720429.0, dated Oct. 15, 2008.
UKIPO Search Report in GB 0720429.0, dated Feb. 19, 2008.

*Primary Examiner* — Christopher P Jones
(74) *Attorney, Agent, or Firm* — McAndrews, Held & Malloy Ltd.

(57) ABSTRACT

A contaminant is removed from a gas in a method in which the gas is contacted with a solvent for the contaminant, and the resultant solution is contacted with intercalated graphite onto which the contaminant is adsorbed. The solvent will normally comprise water, and may itself be a contaminated liquid. In a preferred method the solvent is in a reservoir with particulate intercalated graphite; the contaminated gas is delivered to the base of the reservoir; and the gas rises in the solvent mobilizing the intercalated graphite in the reservoir.

12 Claims, 2 Drawing Sheets

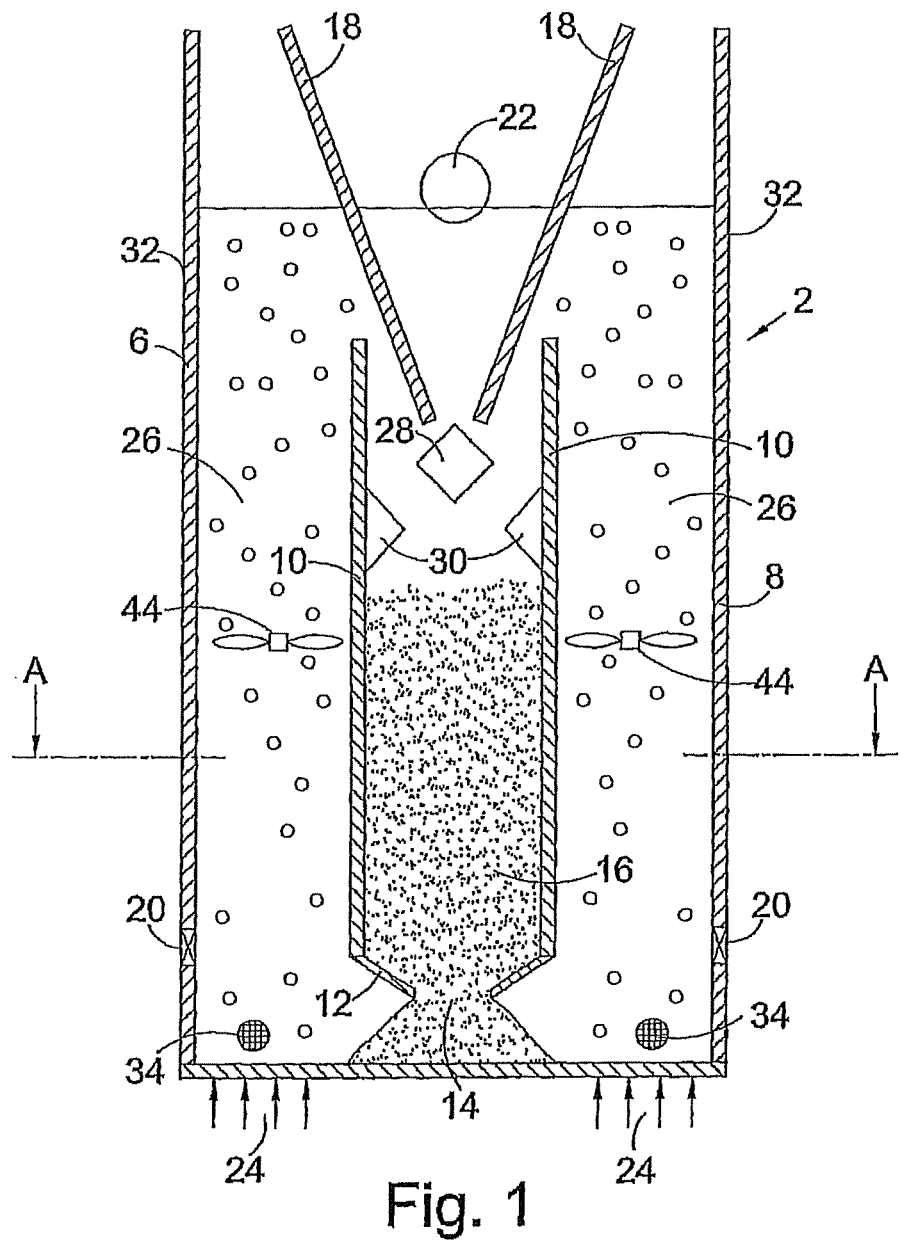
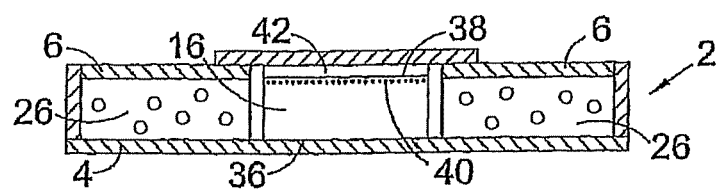
Fig. 1
Fig. 2

TREATMENT OF CONTAMINATED GASES

CROSS-REFERENCE TO RELATED APPLICATION

The present application is a continuation of U.S. patent application Ser. No. 12/760,971, which was filed Apr. 15, 2010, which is a continuation of International Patent Application No. PCT/GB2008/003532, which was filed Oct. 17, 2008, which claims priority to Great Britain Patent No. 0720429.0, which was filed Oct. 18, 2007. The entire text of the aforementioned applications is incorporated herein by reference in its entirety.

This invention relates to the treatment of fluids to remove contaminants, and particularly to the removal of contaminants from air and other gases. It has especial application in the removal of odours, but can also be useful in removing contaminants not having an aroma. Although the invention has a primary application in the anodic oxidation of organic compounds, it can also be used for the cathodic reduction of compounds, and also for disinfection. For example, it can be used to treat combustible gases for the removal of compounds such as siloxanes and for the treatment of gases arising from land remediation.

Reference is directed to International Patent Publication No: WO2007/125334, which discloses apparatus for the treatment of liquid by contact with a particulate adsorbent material. The entire disclosure of Publication No: WO2007/125334 is incorporated herein by reference. Preferred adsorbent materials used in that apparatus are graphite intercalation compounds (GICs). Such adsorbent materials are also disclosed in our British Patent Application No: WO2008/047132, also incorporated herein by reference.

The present invention recognises that adsorbent materials of the kind described in the applications referred to above can be used directly and indirectly in the treatment of air and other gases to remove contaminants and odour containing compounds. Accordingly, in its broadest aspect, the present invention is a method of removing a contaminant from a gas in which the gas is contacted by an intercalated graphite compound. This can be done directly, or indirectly by first contacting the gas with a solvent for contaminant, and then contacting the resultant solution with intercalated graphite onto which the contaminant is adsorbed. The solvent is typically water, and it may itself be contaminated. It may also be another liquid, contaminated or otherwise, and can be one selected for absorbing one or more particular contaminants.

Where the contaminant is first passed to a solvent, the contaminated gas is normally passed through the solvent as bubbles to transfer the contaminant thereto. This procedure can be incorporated in apparatus of the kind described in International Patent Publication No: WO2007/125334 by confining the solvent in a reservoir with the intercalated graphite, and delivering the gas to the base of the reservoir such that it rises in the solvent and mobilises the intercalated graphite in the reservoir. The rising gas can thus provoke circulation of the intercalated graphite, and as described, the apparatus can include a zone in which the intercalated graphite can be regenerated during its recirculation.

It will be appreciated from the above that contaminated gas and contaminated liquids can be treated simultaneously, provided of course the respective contaminants will be adsorbed by the intercalated graphite. The extent to which such simultaneous treatment is possible will depend upon the level of contaminants present, and the capacity of the intercalated graphite and the regeneration mechanism. It will be appreciated though, that the amount of intercalated graphite can of course be selected for a particular task and the rate at which it is recirculated can of course be controlled as can the residence time of the solvent in the reservoir.

In another variation, the same solvent can effectively be used twice in the process of removing contaminants from a gas. The gas can first contact the solvent for direct transfer of the contaminant thereto, and then be recycled through the solvent with the intercalated graphite whereby further transfer of contaminant from the gas takes place, with the contaminant being eventually adsorbed by the intercalated graphite. This initial treatment can be conducted for example in a scrubbing tower prior to recycling of the gas and liquid to a treatment reservoir of the kind referred to above.

An embodiment of the invention will now be described by way of example and with reference to the accompanying schematic drawings wherein:

FIG. 1 is a vertical cross-section through apparatus for conducting a method according to the invention;

FIG. 2 is a horizontal cross-section taken on line A-A of FIG. 1; and

Figure 3:
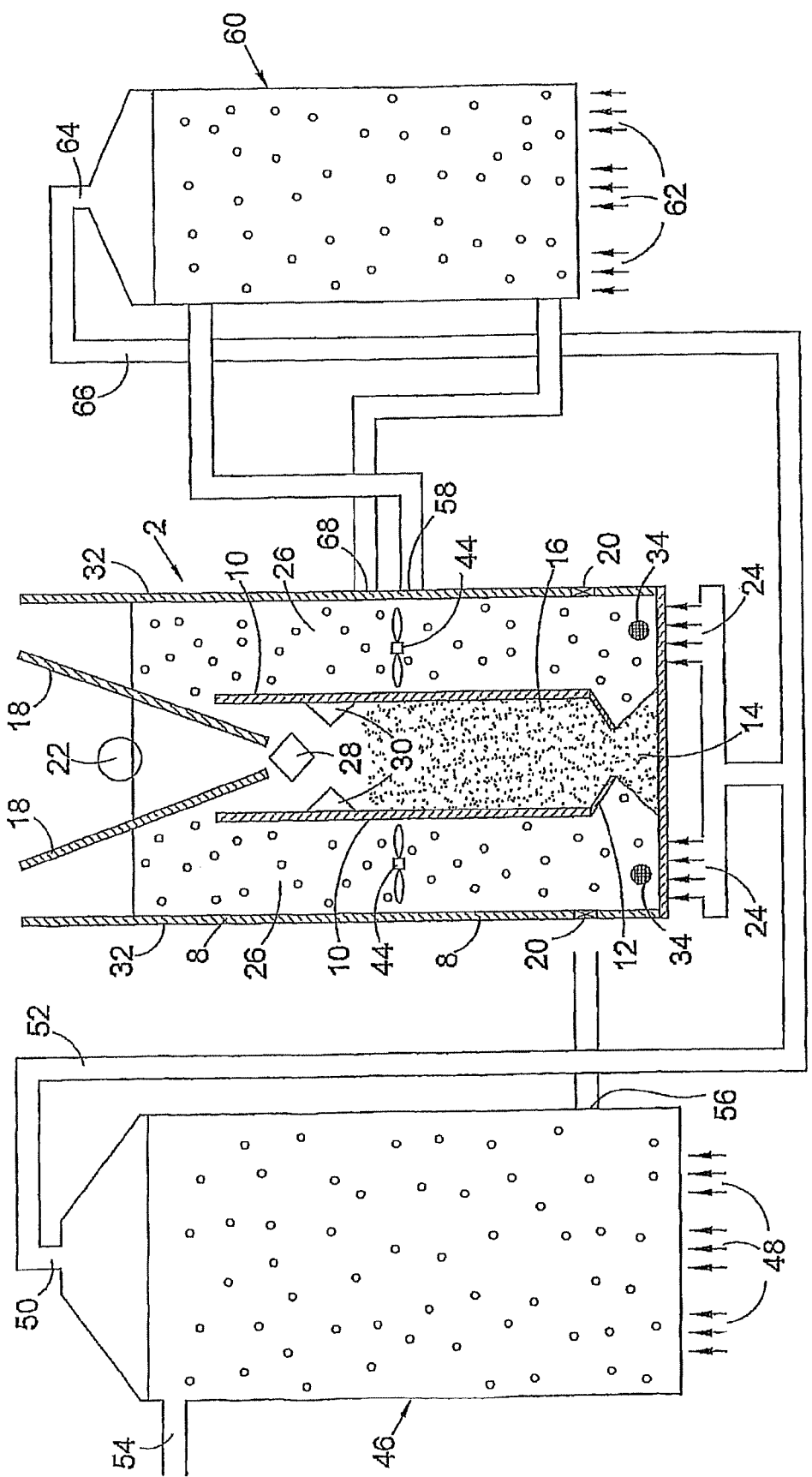
FIG. 3 illustrates how auxiliary treatments can be coupled to the apparatus of FIG. 1.

The drawings show a reservoir 2 of generally rectangular cross-section defined by front and rear walls 4 and 6, and side walls 8. Within the reservoir, inner walls 10 define a regeneration chamber that extends the whole width of the reservoir between the front and rear walls 4 and 6 (FIG. 2). The base of the regeneration chamber is defined by convergent walls 12, which form an opening 14 for the discharge of particulate adsorbent material from the regeneration chamber. Upper walls 18 define a central zone over the regeneration chamber.

When the apparatus is ready for use, an adsorbent material is loaded into the regeneration chamber 16 in the required amount. Liquid is then delivered to the reservoir through inlets 20, and filled to a level just below that of the discharge outlet 22 between the upper walls 18. Contaminated gas or air under pressure is then delivered through openings in the base of the reservoir as indicated at 24. This generates bubbles in the liquid, and draws particulate adsorbent material from below the opening 14 at the bottom of the regeneration chamber, and carries it upward through treatment chambers 26 defined in the reservoir between the respective walls 8 and 10. The rising air or gas carries the adsorbent material around and over the top of the walls 10, where it is guided by the walls 18 back into the regeneration chamber. Obstacles 28 and 30 are installed at the top of the regeneration chamber to control the flow of the solid, liquid and gaseous phases in the reservoir. They can break up any coagulated particles and guide them into the chamber. They also serve to discourage adsorbent particles from entering the zone between the walls 18, from which liquid can overflow, and prevent bubbles generated in the bed of adsorbent materials in the regeneration chamber from entering this zone.

As the contaminated air or gas rises in the reservoir 2 the contaminant is absorbed by the liquid. As the liquid and adsorbent material circulate in the reservoir, transfer of the contaminant continues from both the gas and liquid to the adsorbent particles which can be continuously regenerated in the regeneration chamber.

If the adsorbent material is being used to decontaminate both the liquid and the gas, then provision can be made for both the liquid and the gas to be flowing through the reservoir. In this variant, the liquid is delivered to the reservoir through the inlets 20 at a flow rate selected to match its required residence time in the reservoir and contact with the adsorbent material sufficient to enable absorption of contaminants therefrom. Its general flow is upwards through the reservoir, and it is discharged by overflow through the port 22. It will be noted that the liquid can only reach the discharge port 22 by upward flow from the top of the regeneration chamber, between the walls 18. The walls 18 thus define a quiescent zone protected from movement generated by the air bubbling through the liquid in the treatment chambers.

As bubbles of gas rise in a liquid, particularly a liquid in which solid particles are entrained as in the present invention, they will tend to coagulate into larger bubbles, and consequently present less surface per unit volume of gas for absorbance of the contaminant(s) by the liquid. To counter this, a stirrer or agitator 44 can be installed at an intermediate level in the reservoir 2 to break up enlarged bubbles.

If an additional treatment is used to transfer contaminant from the gas to the liquid, this can be conducted in one or more scrubbing towers 46 separate from the main reservoir 2, as shown on the left in FIG. 3. This can provide an initial treatment with gas entering at openings 48 and leaving at 50. Liquid enters at 54 and leaves at 56. The treated gas then being delivered along pipe 52 to the openings 24 in the main reservoir 2 and the liquid to inlets 20. Alternatively as shown on the right in FIG. 3, liquid, with some entrained gas bubbles and adsorbent particles can be withdrawn from an intermediate point 58 in the treatment chambers 26, to one or more scrubbing towers 60, and contaminated gas fed to the towers at openings 62. The gas is then passed via outlet 64 and pipe 66 to the openings 24 in the main reservoir 2, and the liquid returned to the main treatment chambers 26 at a point 68 downstream of (above as shown) the point 58 or if desired, at the lower inlets 20. The use of one or more scrubbing towers in this alternative way effectively increases the residence time for the gas bubbles in the liquid in the apparatus of FIG. 1, but without increasing the height of the regeneration chamber defined by the walls 10.

Although illustrated as coupled to the same reservoir 2, it will be appreciated that the two types of scrubbers will not normally be used in this way. Typically one or other auxiliary treatment will be used; not both.

While a generally upward flow of liquid to be treated in reservoir 2 is preferred, the opposite arrangement can also be used. Thus, liquid to be treated could be admitted at ports indicated at 32, and withdrawn from discharge points 34. Some form of filter would be required at the discharge points because of the proximity of the adsorbent material, but the air flowing upwards from the reservoir base should prevent blockages. The direction of flow of liquid through the reservoir will of course be selected on the basis of the system requirements, but there may be some benefit in having the flow of liquid generally opposite to the flow of adsorbent material in the treatment chambers. That would be the case if the general direction of flow of liquid in the reservoir was downwards rather than upwards.

As noted above, the apparatus may be used for the separate treatment of individual volumes of liquid. In this variant, the reservoir is filled with liquid to the required level, and the adsorbent material recycled through the regeneration chamber for a period of time appropriate to complete the treatment. The liquid is then removed, for example by drainage from discharge port 34, and a fresh charge of liquid delivered to the reservoir. The adsorbent material will normally be regenerated while it is recycled during the treatment process.

In apparatus of the invention, the adsorbent material is continuously or intermittently regenerated while it passes through the regeneration chamber in its recycling path. Pollutants are released by the regenerating adsorbent material in gaseous form, from the top of the reservoir. These released gases can be discharged to the atmosphere, but can of course be subject to separate treatment if required. They could if needed, be separated from the contaminated gases by redesigning the upper walls 18 to prevent the bubbles from the adsorption (26) and regeneration (16) zones combining. They must of course be separated from the decontaminated gases, and to accomplish this valved seals are provided between the inner walls 10 and the upper walls 18 to permit the downward flow of liquid and adsorbent material, but prevent the upward flow of gases released from the regenerated adsorbent material.

Regeneration of the adsorbent material is accomplished by the application of an electrical voltage between an anode 36 and a cathode 38 disposed on opposite faces of the chamber 16. The cathode is housed in a separate compartment 42 defined by a conductive/permeable membrane 40. This enables a catholyte to be pumped through the compartment, and the membrane protects the cathode from direct contact with the adsorbent material.

By way of example, fresh GIC particles will absorb up to 8 mg/g of ethane thiol and 7 mg/g of methyl propane thiol. A regeneration efficiency of 100% can be achieved with a charge of 30 Coulombs per gram of GIC. In a particular example, passing a current of 0.5 Amps through 20 g of GIC particles for 20 minutes will result in the full electrochemical regeneration of its adsorptive capacity. The presence of sodium sulphite in the solvent liquid, at concentrations of between 125 and 200 mg/l, have been shown to give a significant increase in the absorptive capacity of GIC for both ethane thiol and methyl propane thiol.

The purpose of the membrane 40 is to prevent the solid adsorbent particles coming into contact with the cathode 38 as this could result in the electrons going direct from cathode 38 to anode 36 without passing through the aqueous phase. In this case there would be no organic oxidation and no regeneration of the adsorbent. The membrane 40 must allow the transfer of ions or electrons through it to complete the electric circuit. However, this introduces an additional resistance into the system. Such membranes also only operate well at certain pH levels. In this case the oxidation of the water on the anode side (giving acid conditions) and reduction of water on the cathode side (giving alkali conditions) necessitates pH adjustment to keep the membrane functioning with an acceptable voltage. In practice this requires the catholyte to be monitored and adjusted to keep it acidic, for example by the constant addition of acid, which is undesirable, the pumping of catholyte through the cathode compartments, and suitable pH monitoring and adjustment equipment involving tanks, pumps and probes, which incurs further capital, operational and maintenance costs.

An alternative to the use of a conductive membrane is to use a porous filter. This would prevent the contact of the solid with the cathode, but allow the passage of water and ions. The constant reduction of water at the cathode would result in the catholyte becoming more alkaline, giving a higher conductivity and lower cell voltages. Transfer of the hydroxide ions across the porous filter would neutralise the hydrogen ions generated in the anode compartment.

The invention claimed is:

1. A method of removing a contaminant from a gas, comprising contacting the gas with a solvent for the contaminant, and contacting the resultant solution with unexpanded intercalated graphite onto which the contaminant is adsorbed.

2. A method according to claim 1 wherein the solvent is itself a contaminated liquid.

3. A method according to claim 1 wherein the solvent comprises water.

4. A method according to claim 1 wherein the gas is passed through the solvent to transfer the contaminant thereto.

5. A method according to claim 4 wherein the solvent is in a reservoir with the intercalated graphite, and the contaminated gas is delivered to the base of the reservoir such that it rises in the solvent and mobilises the intercalated graphite therein.

6. A method according to claim 5 wherein the rising gas provokes circulation of the intercalated graphite in the reservoir.

7. A method according to claim 5 including the step of first contacting the gas with solvent for direct transfer of the contaminant thereto prior to delivering the solvent to the reservoir.

8. A method according to claim 7 wherein after said contact with the solvent, the same gas is delivered to the base of the reservoir for further decontamination.

9. A method according to claim 7 wherein the step of contacting the gas with solvent prior to delivering the solvent to the reservoir occurs in a scrubbing tower.

10. A method according to claim 5 including the step of agitating the solvent with entrained gas and intercalated graphite to break up large bubbles of gas therein.

11. A method according to claim 5 wherein the reservoir has a zone in which the intercalated graphite can be regenerated.

12. A method according to claim 1 wherein the intercalated graphite is in particulate form.

\* \* \* \* \*